United States Patent [19]

Beyer et al.

[11] Patent Number: 5,578,228
[45] Date of Patent: Nov. 26, 1996

[54] PROCESS FOR THE LASER BEAM CUTTING OF STRIP OR PLATE WORKPIECES, ESPECIALLY MAGNETIC STEEL SHEETS

[75] Inventors: Eckhard Beyer, Roetgen-Rott; Kai-Uwe Preissig, Dortmund, both of Germany; Dirk Petring, Kerkrade, Netherlands; Dieter Bingener, Kreuztal; Hans-Dieter Riehn, Gladbeck, both of Germany

[73] Assignee: Thyssen Stahl AG, Duisburg, Germany

[21] Appl. No.: 379,665

[22] PCT Filed: Aug. 10, 1993

[86] PCT No.: PCT/EP93/02123

§ 371 Date: Apr. 3, 1995

§ 102(e) Date: Apr. 3, 1995

[87] PCT Pub. No.: WO94/04306

PCT Pub. Date: Mar. 3, 1994

[30] Foreign Application Priority Data

Aug. 12, 1992 [DE] Germany ................... 42 26 620.3

[51] Int. Cl.⁶ .................. B23K 26/12; B23K 26/14
[52] U.S. Cl. .................. 219/121.72; 219/121.84
[58] Field of Search .......... 219/121.67, 121.72, 219/121.84, 121.65, 121.66, 121.6; 148/565

[56] References Cited

FOREIGN PATENT DOCUMENTS

| | | |
|---|---|---|
| 3934920A1 | 5/1990 | Germany. |
| 3925646 | 2/1991 | Germany ................. 219/121.84 |
| 4123716A1 | 1/1993 | Germany. |
| 64-5692 | 1/1989 | Japan ................. 219/121.72 |
| 1-99790 | 4/1989 | Japan ................. 219/121.72 |
| 2-30389 | 1/1990 | Japan ................. 219/121.72 |

OTHER PUBLICATIONS

Plasma Effects in Laser Beam Cutting–D. Petring, K. U. Priessig, H. Zefferer and E. Beyer, Aachen, DVS–Berichte, 1991, vol. 135, pp. 12–15.

*Primary Examiner*—Geoffrey S. Evans
*Attorney, Agent, or Firm*—Meltzer, Lippe, Goldstein, et al.

[57] ABSTRACT

The laser beam melts a plate or strip workpiece with the formation of a vapor capillary at a cutting point and the melt is driven off by a cutting gas consisting of a mixture of inert gas and hydrogen gas, the hydrogen gas making up to 25% by volume of the cutting gas. In order to maintain the vapor capillary, the cutting gas is taken to the surface of the melt at the cutting point at such a pressure and with such a pressure distribution that the temperature at the surface of the melt is kept at boiling point and the melt is continuously driven out of the cutting seam in the side away from the cutting direction of the vapor capillary. The plate or strip workpiece can be a magnetic steel sheet. An additional stream of gas, liquid, or solid particles can be used to move melt out of the cutting seam.

11 Claims, 1 Drawing Sheet

PROCESS FOR THE LASER BEAM CUTTING OF STRIP OR PLATE WORKPIECES, ESPECIALLY MAGNETIC STEEL SHEETS

The invention relates to a process for the laser beam cutting of strip or plate workpieces, more particularly magnetic steel sheets having a thickness of <1 mm, more particularly <0.5 mm, wherein a laser beam emitted by a laser beam source melts the workpiece with the formation of a vapour capillary at the cutting point and the melt is driven off by a cutting gas consisting of an inert gas/hydrogen mixture.

In conventional laser beam cutting use is made, for example, of a 1.5 kW $CO_2$ laser and a standard focusing system, leading to intensities of approximately $10^6$ W/cm$^2$ in the focusing zone. In such cutting a Fresnel absorption takes place at the cutting front of the metal with which any vaporization of the material can be ignored.

The laser beam cutting of metallic workpieces, more particularly the cutting of stainless steel sheet with a thickness of less than 1 mm is known from DE 36 19 513 A1. The active cutting was in the inert cutting gas is oxygen, representing a proportion of 30 to 90% by volume of the cutting gas. The oxygen is used for chemical exothermic reaction with the steel to generate additional thermal energy, so as to accelerate the cutting process. The oxygen also cooperates with the cutting gas to drive the melt produced in the cutting zone out of the cutting seam of the sheet. However, it has been found that the oxidation products cannot be completely driven out of the cutting seam, so that cutting edges substantially free from oxidation products cannot be obtained. Moreover, the chemical exothermic reaction produces a comparatively large heat affected zone laterally of the cutting zone, and this leads to damage to the workpiece, more particularly a metal sheet and any coating disposed thereon.

The parting of magnetic steel sheets has long been regarded as an advantageous field for the application of laser cutting. In one process of this kind (DE 27 43 544 A1) a $CO_2$ laser having a power of several hundred watts is used for the cutting of magnetic steel sheets having a thickness of less than 1 mm. In that laser beam cutting process the workpiece is acted upon at the place of parking by an oxygen-containing gas emitted from a nozzle, the pressure upstream of the nozzle being over 5 bar. In such cutting, cutting speeds of just 10 m/min can be reached, but such speeds are of no economic advantage in the case of magnetic steel sheets. Moreover, due to the resulting heating of those zones of a more particularly grain-oriented magnetic steel sheet which are adjacent to the cutting seam, such low speeds have an undesirable effect on the sheet's magnetic properties. Specialists in the field therefore consider that it is unsuitable to use high power lasers, more particularly a $CO_2$ laser, with which the workpiece is to be cut preferably using oxygen and/or nitrogen as the cutting gas, for the parting of magnetic steel sheets, more particularly grain-oriented magnetic steel sheets ("Stahl und Eisen" 110 (1990), No. 12, pages 147–153).

However, various arguments and experiments are to be found elsewhere which are aimed at higher speeds in the laser beam cutting of workpieces. For example, WO 88/01553 discloses the offsetting of the axis of the laser beam, which is enclosed by a nozzle for supplying gas to the cutting point, in relation to the axis of the pressure center of the gas nozzle, namely in the direction of the uncut sheet. This is based on the idea that the material must first be melted, so that it can then more satisfactorily be driven out of the cutting seam at a subsequent place. However, that kind of laser beam cutting cannot be successfully used with thin sheets, if the intention is to perform cutting at high speeds.

In a recently disclosed process for laser beam cutting of the kind specified ("DVS-Berichte" 135, 1991, pages 12 to 15) cutting speeds of approximately 100 m/min can be reached with a sheet thickness of 0.25 mm, using an iron alloy as the material, when a given kind of laser beam, preferably a $CO_2$ laser is used, with optimally harmonized parameters, such as beam quality coefficient K, focusing coefficient F and focused intensity. In this it makes no essential difference whether hydrogen is admixed with the cutting gas or whether the cutting gas consists primarily of oxygen, since only slightly higher cutting speeds were obtained with oxygen. A cutting process is also known (DE 39 34 920) which enables slots to be cut using a laser beam, cutting taking place with the use of an air jet or oxygen jet which is directed at the sheet upstream of the point of impingement of the laser beam. Such a jet of reactive gas enables wide slots to be produced, the melt being driven out of the slots by the pressurized gas. Such a process differs basically from the process according to the invention, which operates with an inert cutting gas, due to the reactive cutting gas.

In a process of the kind specified which forms the subject matter of an earlier Patent Application (P 41 23 716.1-34), the central axis of the laser beam lies within an inert cutting gas jet containing hydrogen and directed at the workpiece. The cutting gas jet leads in the direction of cutting in relation to the axis of the laser beam and is so directed that the melt is continuously driven out of the cutting seam.

It is an object of the invention to improve the hitherto maximum cutting speed achievable in a process of the kind specified for given materials and workpiece thicknesses, without having to accept any reduction in the quality of the cut edges.

This problem is solved according to the invention by the features that to maintain the vapour capillary, the hydrogen component of the cutting gas is set so high and the inert cutting gas enclosing the laser beam is taken to the surface of the melt at the cutting point at such a pressure and with such a pressure distribution that the vapour capillary remains closed at the bottom, the temperature at the surface of the melt is kept at vaporization temperature and the melt is continuously driven out of the cutting seam on the side away from the cutting direction of the vapour capillary. It is important to the invention to realize that the limits of classical Fresnel absorption for laser beams are exceeded by the high intensity required. Partial evaporation in conjunction with a modified interaction geometry result in the formation of a plasma, which may give laser beams screening, and of a vapour capillary. The vapour capillary is used according to the invention to reach higher cutting speeds, since a melted flux occurs in the cutting zone parallel with the workpiece surface around the vapour capillary, downstream of the vapour capillary melt is driven out of the cutting seam in the downward direction. However, this on its own is not enough, since if the process is wrongly performed the melt may become dammed, with the risk that the melt and the adjacent marginal zones of the cutting seam will become overheated and the cutting seam will become widened. These events may result in the required speed increases remaining achieved, or substantially unachieved.

Since according to the invention the pressure of the cutting gas mixture is adjusted and the highest possible proportion of hydrogen is admixed with the cutting gas, the aforedescribed undesirable events can be limited. It is true that a plasma is also produced by the evaporation of the material, that any screening effect of the plasma on the laser beam is practically obviated; more particularly, moreover, there are no obstacles to the melt being driven out. The reason is that hydrogen has a cooling effect, due to its light molecules, e.g., due to a high recombination rate per threefold collision (electron-ion-hydrogen), so that the risk can be obviated that the melt, the evaporated material and the plasma being formed will become overheated. Another important aspect is that the surface tension of the melt is reduced by the hydrogen, and this counteracts the damming of the melt and any consequent obstacle to its being driven off.

In comparison with the prior art, therefore, the process according to the invention results in burr-free cutting edges and the least possible effect on the zones of the material to be parted which adjoin the cutting edges, accompanied by further increased cutting speeds; this is of importance more particularly for grain-oriented magnetic steel sheets.

In the aforedescribed sense, advantageously the cutting gas contains a proportion of up to 25% by volume of hydrogen. It was possible to achieve speed increases of approximately 15% in comparison with the prior art as disclosed in the aforementioned "DVS-Bericht".

Suitable pressures for the inert cutting gas with a $CO_2$ laser are between 3 bar and 8 bar. Advantageously with a Nd:YAG laser substantially higher pressures are used, namely tp to 50 bar.

It is recommended to use nitrogen or argon as the inert cutting gas. These are industrially available cheap gases. While nitrogen as a rule is particularly suitable for workpieces of ferrous metals, argon may mainly show advantageous inert behaviour with non-ferrous metals.

According to a further feature of the invention, which enables a narrow cutting seam to be produced with a considerable interaction surface of the laser beam with the workpiece, the laser beam is focused on an oval focal spot with main axis extending in the cutting direction. As a result, the intensity of the laser beam is reduced, referred to the cutting front, thus obviating any undesirable vaporization to the workpiece with a correspondingly heavy plasma formation. Another feature favourable to high cutting speed is the focused focal spot of the laser beam is kept at half the height of the workpiece (in the centre of the workpiece thickness).

According to one feature of the invention the inert cutting gas is guided eccentrically of the laser beam axis and impinges with a lead on the cutting point. Also advantageously the cutting gas impinges on the cutting point at an angle <90°. All the embodiments share the feature that the pressure centre of the inert cutting gas is shifted in the direction of the uncut workpiece. Due to this adjustment, a transverse pressure gradient is produced when the gas jet enters the cutting seam. This gradient produces a flow component in the direction of the longitudinal extension of the open cutting seam, thus achieving the quicker removal of the melt and the vapour from the zone of interaction between the laser beam and the sheet material, and also a reduced evaporation. The emergence of the melt is accelerated by cooperation between the reduction of the surface tension of the melt by the hydrogen of the cutting gas and the transverse pressure gradient thereof.

To enable the laser beam to be focused as strongly as possible, a laser beam of low mode order is selected—i.e., as high a beam quality coefficient K as possible, of preferably >0.5.

To boost the expulsion of the melt from the cutting seam on the side of the vapour capillary away from the cutting direction, use can additionally be made of an additional jet consisting of gas, liquid or particles.

BRIEF DESCRIPTION OF THE DRAWINGS

The invention will now be explained with reference to the drawings, which show.

Figure 1:
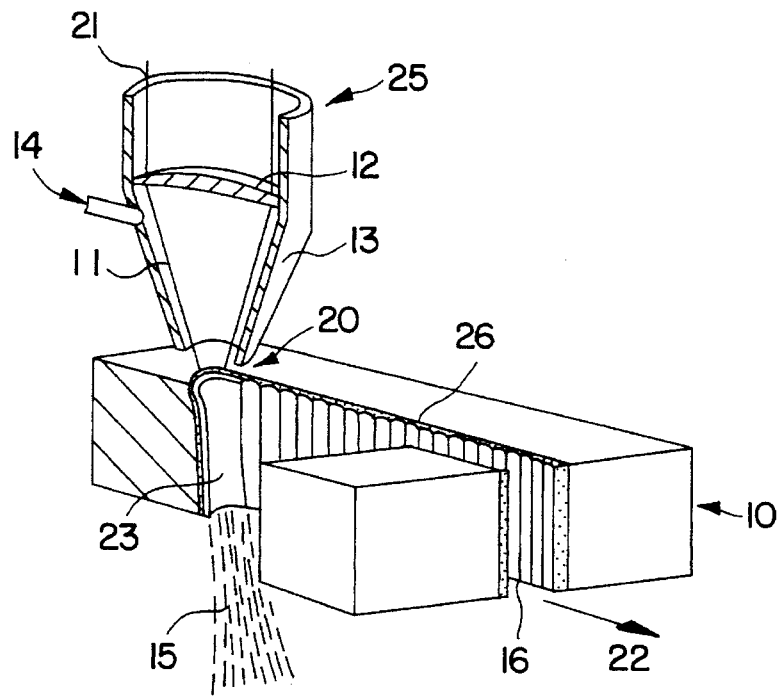
FIG. 1 a diagrammatic view of a laser beam cutting device in perspective.

A cutting device 25 having a laser beam 21 is guided over a workpiece 10, the laser beam 11 being focused by an optical focusing system 12. The focused laser beam 11 is directed at the workpiece 10 (sheet) which has a thickness d. When the sheet 10 is moved in relation to the cutting device 25 in the direction indicated by arrow 22, the laser beam 11 produces a cutting seam 16 in the sheet.

The cutting speeds are, for example, in the case of sheets having a thickness less than 1 mm, up to 250 m/min and more. The cutting device 25 can be used, for example, in slipping and/or cut-to-length installations and also in trimming installations, where the sheet, for example, is wound off a coil.

Figure 2:
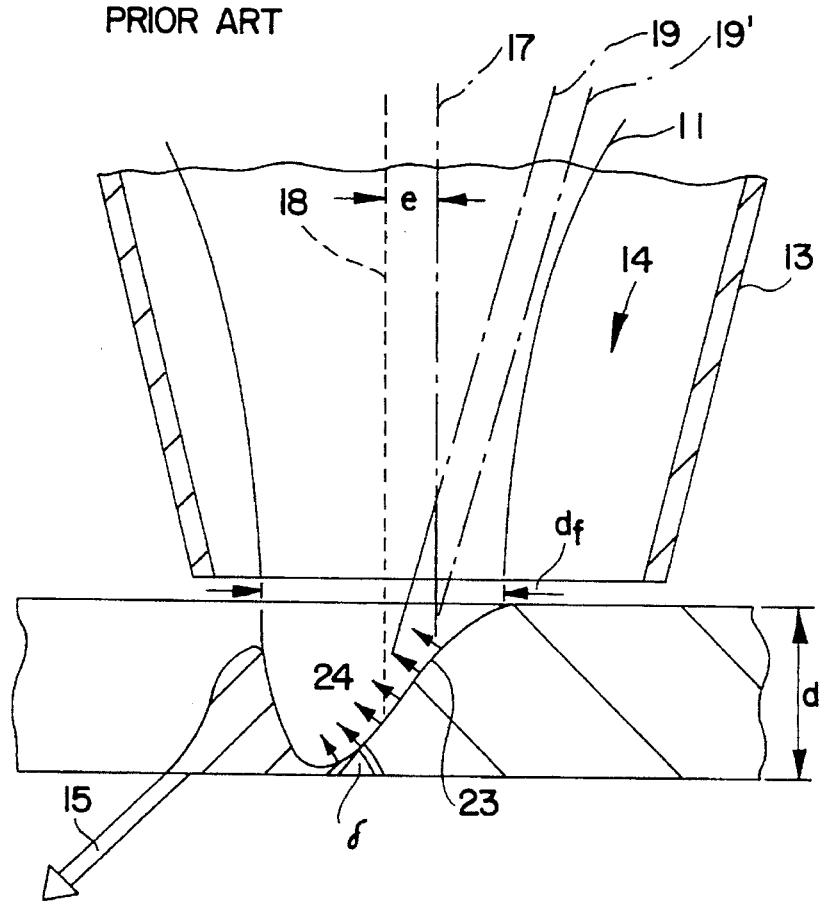
FIG. 2 a diagrammatic longitudinal section through the cutting zone of a workpiece of thickness d.

The optical focusing system 12 has a focusing lens by which the laser beam 11 is so focused that the focus lies in the zone of half the sheet thickness d; of. FIG. 2. In view of the thin sheets which are to be cut, and more particularly due to the required narrow cutting seam 16, focusing must be as strong as possible—i.e., the focus must be as small as possible. This can be achieved inter alia by the laser beam having as low a mode order as possible.

The laser beam 11 is enclosed by a gas nozzle 13 for cutting gas 14. The cutting gas 14 impinges on cutting zone 20 of the sheet 10 in the direction of the laser beam 11. The gas consists of an inert gas, such as nitrogen or argon, which is mainly used for driving out the melt 15 produced during cutting by the laser beam 11. Also admixed with the cutting gas is hydrogen, whose effect will be further disclosed hereinafter.

Cutting at speeds corresponding to the prior art produces a cutting front 23 (FIG. 1) from which the melt 15 is directly driven out. It is impossible in this way to achieve optimum conditions for high cutting speeds with the lowest possible thermal stressing of zones 26 adjoining the cutting seam 16 and oxidation-free cutting edges 16. Only the use of the steps according to the invention enables a transition to be made to higher cutting speeds, the cutting seam then being closed at the bottom—i.e., the melt first remains in the seam, with the formation of a vapour capillary, as shown in FIG. 2. The formation and maintenance of the vapour capillary enables the melt to remain comparatively highly liquid. The higher energy coupling due to the resulting vapour capillary enables higher cutting speeds to be achieved, and thereby reduce thermal stressing of the adjacent zones 26 and the oxidation-free cutting edges. FIG. 2 also shows how in the process according to the invention the cutting front 23 lies substantially flatter, namely with an angle of, for example, 65°–75°, in comparison with conventional cutting with pure or practically exclusive Fresnel absorption, where the angle is close to 90°—i.e., the cutting front 23 extends very steeply. The flat cutting front 23 is explained in the case of thin sheets with the high ratio between focus diameter $d_f$ and sheet thickness d, in spite of the higher beam intensity and the stronger focusing. In the conventional cutting of, for example, sheets 3 mm in thickness with focus diameter $d_f$=3/10 mm, a ratio of 1:10 is obtained, referred to the sheet thickness d. In spite of higher beam intensity, due to heavier focusing to, for example, 6/100 mm, the result with a sheet thickness of 0.2 mm is a ratio of 3:10, so that the cutting front must therefore lie flatter at maximum cutting speed, so as to completely couple in the laser beam. This means a larger interaction surface. There is also a comparatively heavy damming of the melt, since due to the high cutting speed there is a large volumetric flow, and the maximum speed of the melt flow is limited. Inter alia, therefore, a heavier evaporation of the material of the sheet takes place in the direction indicated by arrows 24 in FIG. 2. Together with the flatter cutting front 23, therefore, the flow speed of the melt 15 is also reduced at its expulsion, and the rate of metal evaporation increases, so that a screening metal vapour plasma may occur at the high laser intensities. Both of these things are obviated by admixing hydrogen with the inert cutting gas. The hydrogen reduces the surface tension of the melt, so that it can be more rapidly blown out, so that the molten film thickness, surface temperature and evaporation rate are reduced. This circumstance is very important, if it is remembered that although the cutting seam 16 is narrow and the sheet is thin, the mass flow (mass per unit of time) to be expelled is as a whole, however, very great, due to the high cutting speed. Moreover, the light molecules of the hydrogen cool the plasma and thus counteracts the occurrence of a screening metal vapour plasma. As a result, in addition to the increase in maximum cutting speed, the stability of the cutting process is also enhanced, this also having a corresponding positive effect on the quality of cutting.

FIG. 2 shows the laser beam 11 with a focus of diameter $d_f$ lying in the zone of the sheet thickness d. The associated axis of the laser beam 11 has the reference 18. The gas jet 13 is also constructed rotation-symmetrically, its axis having the reference 17. The axis 17 is in this case a synonym for the pressure centre of the cutting gas 14, which can be seen from FIG. 1 to be supplied to the cutting zone 20.

A notable feature of the relative association of the gas nozzle 13 and the laser beam 11 is that the axis 17 of the gas nozzle 13 is disposed with an eccentricity e in relation to the axis 18 of the laser beam 11, being offset in the direction of the uncut sheet 10. As a result of this leading nozzle adjustment, when the cutting gas 14 enters the cutting seam 16, a transverse pressure gradient is produced in the longitudinal direction of the open cutting seam—i.e., perpendicularly to the axis 18. As a result, the metal vapour produced is so affected that it is possible to obviate any screening effect of the metal vapour plasma. Also, the melt is removed more quickly in the direction of the comparatively flat cutting front 23. Although due to the flatter cutting front 23 the expulsion path is longer than with a steeper cutting front, as a result of the cooperation between the hydrogen, reducing the surface tension of the melt, and the improved transverse guiding of the cutting gas, the melt 15 is more satisfactorily expelled.

FIG. 2 shows how a transverse pressure gradient of the cutting gas can also be produced by the gas nozzle 13 being disposed with axes 19 or 19' inclined in relation to the sheet 10. In conjunction with the inclination of the cutting front 23, the inclination and arrangement of the axes 19, 19' determines the value of the transverse pressure gradient. The difference in the arrangement of the axes 19, 19' is that the axis 19 intersects the cutting front in the zone of the axis 18 in the cutting zone 20, while the axis 19' lies upstream of the aforementioned cutting point in the direction of the uncut sheet 10. The cutting gas 14 impinges on the cutting front 23 and/or on the uncut sheet 10.

FIG. 2 shows the laser beam 11 with a focus of diameter $d_f$. The beam cross-section is therefore circular. However, the laser beam 11 can also be focused preferably elliptically or elongate. In this case $d_f$ is the length of the major semi-axis of the ellipse, the ellipse being disposed in the cutting direction. Consequently, the intensity of the laser beam on the flat cutting front is reduced, and therefore the interaction surface when the laser beam is applied to the sheet is enlarged. The cutting process can be stabilized thereby, since plasma formation and melt expulsion can be more satisfactorily controlled. At the same time the width of the laser focus can be kept small and, correspondingly, so can the width of the cutting seam 16.

Via the process according to the invention it is possible to reach cutting speeds of above 100 m/min, preferably up to 250 m/min and more, with an oxidation-free cutting edge. Due to the high cutting speed, there is not much adverse thermal effect on the marginal zones of the cutting seam, an aspect which is particularly important in the case of grain-oriented magnetic steel sheets.

We claim:

1. A process for laser beam cutting of a strip or plate workpiece along a cutting seam, comprising focusing a laser beam at a cutting point in said cutting seam of said workpiece, thereby forming a vapor capillary at said cutting point and a melt of said workpiece in said cutting seam, and directing a cutting gas at said melt in said cutting seam to drive off said melt, wherein said cutting gas comprises a mixture of an inert gas and hydrogen gas, wherein the hydrogen gas component of said cutting gas is sufficiently high and the cutting gas is directed to the surface of said melt at said cutting point at a pressure and with a pressure distribution so that said vapor capillary remains closed along its bottom, wherein the temperature at the surface of said melt is at the vaporization temperature of said melt, and wherein said melt is continuously driven out of said cutting seam in a direction away from a cutting direction of said vapor capillary.

2. The process of claim 1 wherein said workpiece comprises a magnetic steel sheet having a thickness of less than 1 mm.

3. The process of claim 1 wherein said workpiece is a magnetic steel sheet having a thickness of less than 0.5 mm.

4. The process of claim 1 wherein said cutting gas comprises up to 25% by volume of hydrogen gas.

5. The process of claim 1 wherein said laser beam is generated by a $CO_2$ laser, and the pressure of said cutting gas is between 3 bar and 8 bar.

6. The process of claim 1 wherein said laser beam is generated by a Nd:YAG laser, and the pressure of said cutting gas is up to 50 bar.

7. The process of claim 1 wherein said cutting gas is directed eccentrically of an axis of said laser beam and impinges on a point in said cutting seam ahead of said cutting point.

8. The process of claim 1 wherein said cutting gas impinges on said cutting point at an angle of less than 90°.

9. The process of claim 1 wherein said laser beam is focused on an oval focal spot having a main axis extending in said cutting direction.

10. The process of claim 9 wherein said focal spot of said laser beam is in the zone of no more than one half the height of said workpiece.

11. The process of claim 1 wherein said melt is additionally driven out of said cutting stream downstream of said vapor capillary by an additional beam of gas, liquid, or solid particles.

* * * * *